June 1, 1948.  A. C. STALEY ET AL  2,442,669
SUPERCHARGER CONTROL
Filed July 27, 1942  2 Sheets-Sheet 1
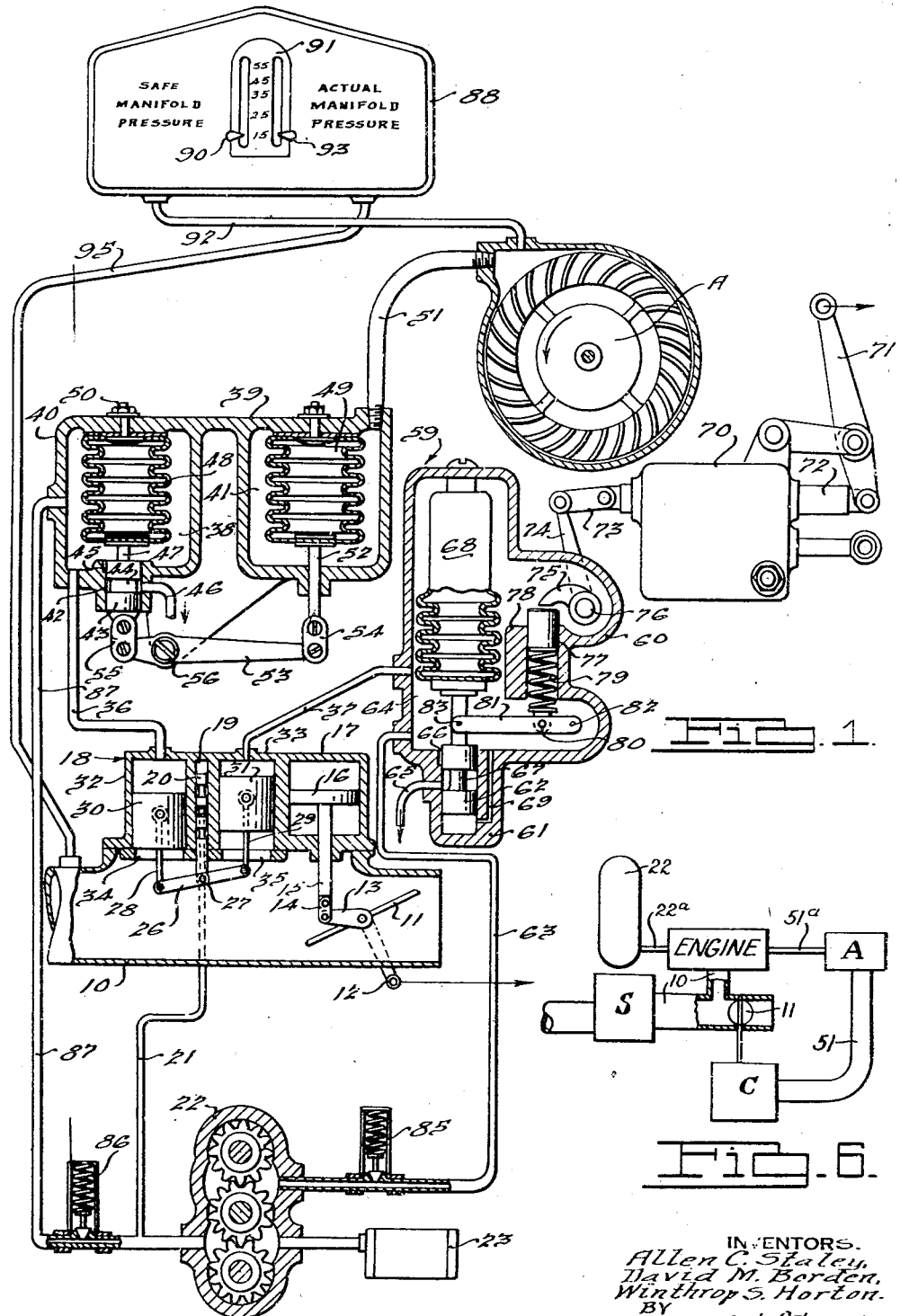
INVENTORS.
Allen C. Staley,
David M. Borden,
Winthrop S. Horton.
BY
ATTORNEYS.

June 1, 1948.　　A. C. STALEY ET AL　　2,442,669
SUPERCHARGER CONTROL
Filed July 27, 1942　　2 Sheets-Sheet 2
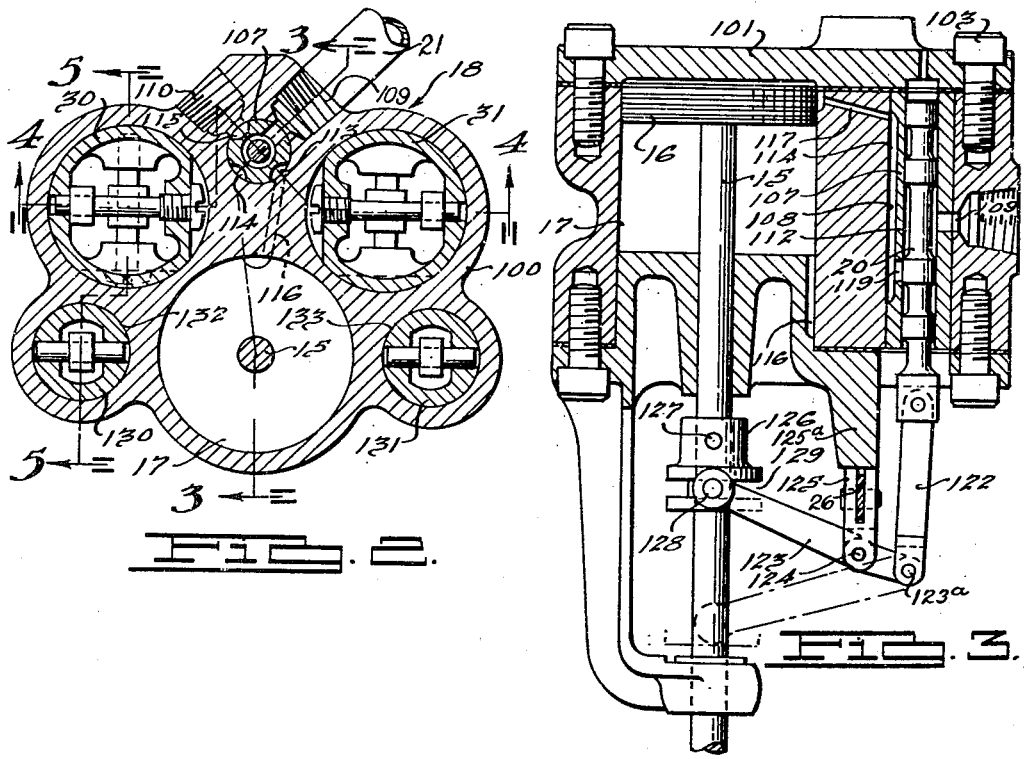
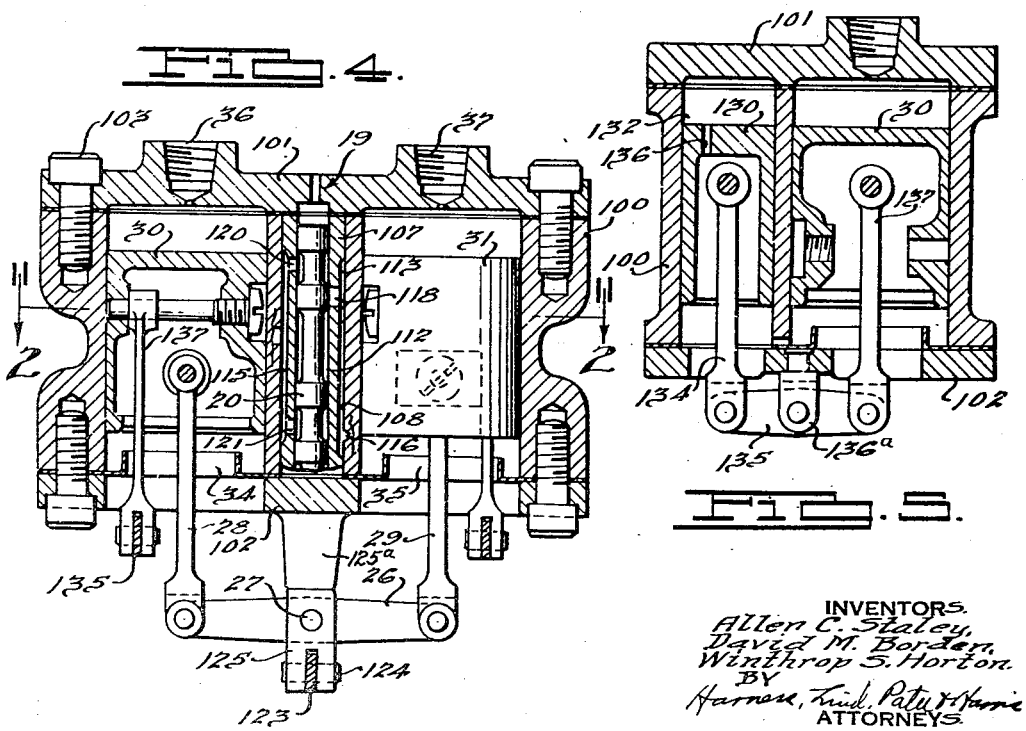
INVENTORS.
Allen C. Staley,
David M. Border,
Winthrop S. Horton.
BY
Harness, Dickey, Pate & Harris
ATTORNEYS.

Patented June 1, 1948

2,442,669

UNITED STATES PATENT OFFICE 2,442,669

SUPERCHARGER CONTROL

Allen C. Staley, Birmingham, David M. Borden, Royal Oak, and Winthrop S. Horton, Birmingham, Mich., assignors to Chrysler Corporation, Highland Park, Mich., a corporation of Delaware Application July 27, 1942, Serial No. 452,474

12 Claims. (Cl. 123—119)

This invention relates to superchargers for internal combustion engines and particularly to control mechanism for superchargers by means of which the supercharger pressure is automatically regulated in accordance with predetermined desired performance characteristics.

It is the principal object of this invention to provide supercharger control mechanism for use in connection with aircraft power plants which is adapted to function without attention after once being set, thereby relieving the pilot of the necessity for constantly adjusting the supercharger speed and/or pressure to prevent "pumping".

A further object is to provide such a control which will function automatically to maintain a predetermined desired pressure in the engine manifold.

A still further object is to provide means for maintaining a predetermined manifold pressure while varying the velocity of the air passing through the supercharger compressor.

Another object is to provide in such a control mechanism, means for preventing pumping or surging of the supercharger with changes in engine speed and/or altitude while at the same time maintaining the aforesaid desired pressure in the engine manifold.

Another object is to provide control means for a supercharger "waste gate" or "spill valve" which is responsive to a pair of independent control mechanisms each of which is automatically responsive to certain predetermined operating conditions.

Other objects include the provision of novel and improved servo-motor mechanism for controlling the supercharger waste gate, improved control mechanism for the servo-mechanism and other features which will be apparent from the following description.

In the accompanying drawings in which reference characters are used to designate corresponding parts referred to in the following description:

Fig. 1 is a diagrammatic showing of the spill valve control, the various constituent parts of the mechanism being illustrated in schematic form.

Fig. 2 is a cross-sectional view taken on line 2—2 of Fig. 4, showing a servo-motor for operating the supercharger spill valve.

Fig. 3 is a secton along line 3—3 of Fig. 2.

Fig. 4 is a section along line 4—4 of Fig. 2 with parts of the valve broken away, Fig. 5 is a section along line 5—5 of Fig. 2, and Fig. 6 is a diagrammatic view showing the relation of the spill valve control to the engine.

Referring now to Fig. 1, the discharge end of a supercharger S is connected to an engine manifold 10, it being understood that either a radial or an axial type of supercharger may be used, or a combination of both. The supercharger S is connected by the manifold 10 to an engine E, as shown diagrammatically in Fig. 6. This figure also shows diagrammatically a control C for a spill valve 11.

The spill valve (or waste gate) 11 is provided with an operating lever 12 which is adapted to be manually actuated by suitable means (not shown) such that, in the event of failure of the hydraulic control about to be described, manual control of the supercharger may be had.

Another lever 13 operably connected to the valve 11 is connected by a link 14 with a piston rod 15, the latter in turn being actuated by a piston 16 slidably carried in a cylinder 17 which forms part of a hydraulic servo-motor generally designated by the numeral 18.

The servo-motor 18 includes a valve 19 having a reciprocable stem 20. Fluid under pressure flows from the pressure side of a pump 22 through a line 21 into the valve at an inlet port 109 (Figs. 2 and 3), as will be hereinafter described. This pump is adapted to be driven by the engine by means 22ª and draws fluid from a sump or reservoir (not shown) through a filter 23. The valve 19 is also connected to the cylinder 17 above and below the piston 16 by conduits 117 and 116 (Figs. 2 and 3), as will be hereinafter described.

The valve stem 20 is actuated by a linkage which includes a walking beam 26 pivotally connected to the valve stem at 27. The walking beam is connected at each end by links or rods 28—29 with a pair of pistons 30—31. The latter are slidably carried in the cylinders 32—33 of the servo-motor.

Openings 34—35 subject the pistons 30—31 respectively to the pressure existing in the supercharger discharge portion 10. This pressure is balanced on the pistons by fluid pressure which enters the cylinders 32—33 through conduits 36 and 37. These conduits are connected to pressure regulating devices which will now be described.

The conduit 36 connects the top of cylinder 32 with a chamber 38 of a pressure regulator generally designated by the numeral 39. The latter comprises a relatively heavy section casing 40 which is formed with the aforesaid chamber 38 and a second chamber 41. The chamber 38 is formed at the lower end thereof with a bore 42 in which is slidably disposed a valve piston 43.

The latter is provided with a central reduced portion 44 and the bore 42 is provided with a relief portion 45, the arrangement being such that the chamber 38 is placed in communication with a drain or vent pipe 46 upon upward movement of the valve piston.

The valve piston 43 has an integral neck portion 47 which is attached to the lower end of a metallic bellows 48. The latter is evacuated and sealed and is held to the upper surface of the casing 40 by a bolt 50. A conduit 51 connects the interior of the chamber 41 with a pilot compressor driven by the engine E through means 51ᵃ, represented diagrammatically in Fig. 6. The compressor operates at a speed proportional to engine speed at all times. The interior of the chamber 41 is thus subjected to a certain pressure which varies in accordance with engine speed and air density. The chamber 41 contains a metallic bellows 49 which is evacuated and secured in the chamber in a manner similar to the bellows 48. The bellows 49 is operably connected to valve piston 43 by means of neck 52, link 54, lever 53 and link 55. The lever 53 is pivoted on the casing 39 at 56, the pivot point being chosen to provide a mechanical advantage in favor of the bellows 49. This pressure in chamber 41 thus tends to move the valve piston 43 downwardly which action is opposed by the pressure of the oil in chamber 38 supplied from pump 22 through conduit 87. The pump 22 is of such capacity that the pressure in chamber 38 will tend to overcome the pressure inside the bellows 48 under all conditions of operation and thus tend to move the piston 43 upwardly and vent the chamber 38. As soon as the chamber is vented the pressure therein will, of course, fall and the valve piston 43 will then move downwardly to close the vent causing the pressure in the chamber to build up and repeat the cycle. This results in the valve piston 43 continually "hunting" and thus the pressure in chamber 38 is maintained at a value that is a certain multiple of the pressure in chamber 41 which in turn is a function of engine speed and air density.

The cylinder 33 is connected by conduit 37 with a pressure regulator generally designated by numeral 59. This regulator comprises a casing 60 formed with a valve housing 61 in which is reciprocable a valve piston 62. A conduit 63 connects the chamber 64 of the regulator with the pump 22 and a drain pipe 65 connects with the fluid reservoir or engine sump. The casing has a relief portion 66 and the valve piston has a reduced portion 67 so that the chamber 64 can be vented by operation of the valve piston 62. The latter is operably connected with a closed bellows 68 which is supported in the regulator casing by suitable means. The bellows 68 is filled with air or other fluid to a predetermined pressure and thus exerts a downward thrust on the valve piston 62 which is opposed by the pressure of the oil in the chamber 64 acting on the outside of the bellows. A bleed passage 69 connects the underside of the piston 62 with the chamber 64 thus balancing the pressure on the piston and rendering the valve sensitive to small variations in pressure.

The valve piston 62 will close the drain 65 when the pressure in chamber 64 is less than the pressure inside the bellows 68 and it will open the drain 65 when the chamber or oil pressure exceeds the bellows pressure. The regulator 59 then will act to maintain a constant pressure and hunt within narrow limits in chamber 64 and in cylinder 33.

For short intervals during take-off of the aircraft or at other times, it is sometimes desirable to provide supercharger pressure in excess of that normally maintained by the constant pressure regulator 59. For this purpose a manual overload control is provided.

This control generally designated at 70 includes a manually operated lever 71 operably connected by means of rod 72, link 73 and lever 74 with a lever 75 pivoted at 76 inside the casing 60. The lever 75 is adapted to bear on a plunger 77 slidably carried in a bore formed in a boss 78 of the casing. The plunger bears on a coiled compression spring 79 which is pivotally attached at 80 to a lever 81. The lever 81 is pivoted in the casing at 82 and to the valve piston 62 at 83.

By manipulation of the lever 71 to push the plunger 77 downwardly, the pressure of the spring 79 may be added to the force of the bellows 68 and a higher pressure is thus maintained in chamber 64.

Suitable relief valves 85 and 86 are provided in hydraulic lines 63 and 87 for relieving the system of excess pressure.

In case of failure of the automatic control, manual operation of the spill gate 11 by means of suitable mechanism connected with the lever 12 is necessary. To guide the pilot or flight engineer in correctly adjusting the valve 11, an indicating meter 88 has been provided.

This meter is fully described in Staley Patent No. 2,389,281, dated November 20, 1945, and will be only briefly described herein as it forms no part of this invention.

The meter 88 has an indicating pointer 90 adapted to move over a scale 91 which is calibrated in inches of mercury. The pointer 90 is controlled by a bellows mechanism connected by a pipe 92 with the pilot blower 52. Another pointer 93 controlled by a second bellows connected with the supercharger output by pipe 95 is also adapted to move over the scale 91. The pointer 90 then will indicate the maximum safe manifold pressure under all conditions of engine operation and the pointer 93 will indicate the actual manifold pressure, thus by adjusting the engine operation to keep the pointer 93 aligned with the pointer 90, pumping of the supercharger can be avoided.

The meter 88 is also useful in checking the operation of the automatic spill control as will be obvious.

The operation of the device as a whole will now be described for a typical set of conditions. Let it be assumed that it is desired to maintain a normal operating engine manifold pressure of 53 inches of mercury at sea level. A bellows 68 filled with air or other fluid to a pressure of 53 inches of mercury is placed in the regulator 59 and during operation of the pump 22 (which normally supplies fluid at a pressure in excess of 53 inches) the regulator 59 will function as described above to maintain a constant pressure in the cylinder 33 of servo-motor 18 of 53 inches.

The regulator 39 will also function to maintain a pressure of 53 inches in servo cylinder 32 so long as the altitude of the plane and the engine speed remain within predetermined limits.

During take-off of the plane the overload control 71 may be manipulated to add the force of the spring 79 to the force of the bellows 68 and the pressure in the cylinder 33 will rise to a value in excess of 53 inches for a short time dependent upon the holding characteristics of the holding mechanism 70.

After the aircraft has taken off the regulator 59 will tend to maintain the prescribed pressure in cylinder 33 and the spill valve 11 will be regulated in accordance therewith.

The regulator 39 will function in accordance with changes in engine speed and air density and will regulate the valve 11 to reduce the manifold pressure sufficiently to prevent surging of the supercharger. It will be seen therefore, that the control pistons 30 and 31 will act in opposition during most of the operating time of the aircraft which will result in the piston 16 continuously "hunting." The valve 11 will thus be controlled in such manner that the highest possible pressure will be maintained in the manifold but pumping or surging will be prevented under all conditions.

Referring now to Figs. 2-5 inclusive, which illustrate a preferred form of servo-motor for controlling the spill valve 11 in the control system just described, the servo-motor 18 comprises a housing 100 of relatively heavy section which is provided with upper and lower head members 101, 102 secured on the housing by cap screws 103.

In the housing 100 are formed six cylindrical openings symmetrically arranged. The cylinder 17 slidably receives the main operating piston 16, the piston rod 15 being adapted for connection to the supercharger spill valve 11 by means of suitable linkage such as the members 13, 14 of Fig. 1.

The valve which controls the piston 16 includes a sleeve 107 which fits snugly in a cylinder 108. The valve has an inlet port 109 and an outlet port 110. The inlet port 109 extends through the wall of sleeve 107 and communicates with the inner valve chamber 112 in which is slidably disposed the valve stem 20. The stem 20 is provided with raised portions which cooperate with the various ports as will be explained.

The valve sleeve 107 is provided with three longitudinal grooves 113, 114 and 115 as can be seen from Fig. 2. The groove 115 is directly connected with the outlet port 110; groove 113 is connected by a passage 116 with the lower end of cylinder 17; and groove 114 is connected by a passage 117 with the upper end of cylinder 17. The inner chamber 112 connects with groove 113 by means of a port 118 (Fig. 4), with the groove 114 by means of a port 119 (Fig. 3) and with the groove 115 by means of ports 120, 121 (Fig. 4).

The valve stem 20 is operatively connected by means of a link 122 with a follow-up lever 123 by a pivot 123ᵃ. The lever is pivoted at a point intermediate its length to a floating yoke member 125 by means of a pin 124. The piston rod 15 carries a grooved collar 126 which is fixed thereon by a pin 127. The follow-up lever 123 is provided with a pin 128 which fits into the groove 129 of the collar as shown in Fig. 3.

The yoke member 125 has slots cut perpendicular to one another, one for accommodating the follow-up lever 123 and another for accommodating the walking beam 26 which is pivoted at its central point to the yoke member by the pin 27. The walking beam 26 is pivotally connected at each end with the connecting rods 28, 29 respectively, the latter in turn being pivoted at their upper ends with pistons 30 and 31 respectively. A stop 125ᵃ formed on the lower head member 102 limits upward movement of the floating yoke member 125.

It may thus be seen that unequal or opposite movement of the pistons 30, 31 or movement of one while the other is stationary, will cause the yoke 125 to be bodily displaced. Displacement of the yoke downwardly will effect downward movement of valve stem 20 opening the upper end of cylinder 17 to pressure by way of passage 117, groove 114 and ports 119 and 109. At the same time, the lower end of cylinder 17 is opened to drain by way of passage 116, groove 113, ports 118, 120, groove 115 and port 110.

The piston 16 will move downwardly and thereby rock the follow-up lever 123 which will again close the valve 19 and stop the piston 16 (and the spill valve 11) in the desired position as determined by the positions of pistons 30 and 31. In other words, when the piston 16 is stationary the valve 19 will be opened by movement of the yoke 125 under influence of the pistons 30, 31. When the yoke 125 becomes stationary the valve is instantly closed by the follow-up device.

In order to render the servo-motor instantly responsive to changes in manifold pressure the pistons 30, 31 are respectively counter-balanced by balancing pistons 130, 131. These balancing pistons are equal in weight with the pistons 30, 31 and are reciprocable in relatively small bore cylinders 132, 133 disposed on each side of the control cylinder 17.

The piston 130 is connected by means of a rod 134 with a rocker member 135 which is pivoted at its center to the housing head 102 by a bracket 136ᵃ. The piston 30 carries an auxiliary connecting rod 137 disposed on one side of the main rod 28 and this rod is pivoted at its lower end to the rocker 135. A vent 136 in the head of piston 130 facilitates easy movement thereof. The piston 31 is connected to its counter-balancing piston 131 by a similar arrangement.

From the drawing it is clear that movement of either of the pistons 30, 31 is accompanied by equal and opposite movement of the pistons 130, 131, thus the inertia of the pistons 30, 31 is compensated for and the servo-motor device is rendered extremely sensitive and quick acting.

Although but one specific embodiment of the invention is herein shown and described, it will be understood that various changes in the sequence of operations, steps and materials employed may be made without departing from the spirit of the invention.

We claim:

1. In combination with a supercharger for supplying air through a line to an engine, apparatus for maintaining predetermined supercharger pressure while maintaining the supercharger within its pumping limit throughout relatively wide limits of operating speeds and supercharger inlet air densities respectively, including a waste gate communicating with the said line for permitting the escape of air therefrom; a motor for controlling said gate; and means for controlling said motor including a constant pressure regulator and a regulator responsive to changes in engine speed and supercharger inlet air density.

2. In combination with a supercharger for supplying air through a line to an engine, apparatus for maintaining predetermined supercharger pressure while maintaining the supercharger within its pumping limit throughout relatively wide limits of operating, speeds and inlet air densities respectively, including a wastegate communicating with the said line for permitting the escape of air therefrom; a motor for controlling said gate; a valve for controlling said motor; and means controlling said valve including a piston subjected to the engine pressure on one side thereof and to variable pressure on the other side thereof, and means for varying said variable pressure in accordance with changes in supercharger speed and supercharger inlet air density respectively.

3. In combination with an engine supercharger having a waste gate for controlling output of and maintaining the supercharger within its pumping limit, a motor for controlling the waste gate; a valve for controlling said motor; means for operating said valve comprising a pair of pistons respectively subjected to supercharger discharge pressure on one side thereof; means for applying constant predetermined pressure to the opposite side of one of said pistons, and means for applying variable pressure to the opposite side of the other of said pistons, said variable pressure being variable in accordance with changes in supercharger inlet air density and engine speed respectively.

4. In a supercharger control, a waste gate; a piston motor for controlling said gate; a valve for controlling said motor including a valve member adapted for to-and-fro movement from closed position to admit pressure fluid to said motor on opposite sides of the piston thereof; a link pivoted at its center to said valve member; a pair of pistons having piston rods pivotally connected to the opposite ends of said link; means for subjecting one side of said pistons to supercharger discharge pressure; means for subjecting the opposite side of one of said pistons to predetermined desired pressure, and means for subjecting the opposite side of the other piston to variable pressure.

5. In a supercharger control, a waste gate; a piston motor for controlling said gate; a valve for controlling said motor including a valve member adapted for to-and-fro movement from closed position to admit pressure fluid to said motor on opposite sides of the piston thereof; a link pivoted at its center to said valve member; a pair of pistons having piston rods pivotally connected to the opposite ends of said link; means for subjecting one side of said pistons to supercharger discharge pressure; means for subjecting the opposite side of one of said pistons to predetermined desired pressure; means for subjecting the opposite side of the other piston to variable pressure which pressure varies in accordance with supercharger inlet air density and engine speed.

6. A fluid servo-motor comprising a housing, a working cylinder in said housing; a control valve disposed adjacent said working cylinder; a pair of control cylinders disposed in said housing in symmetrical relation with respect to said working cylinder and valve; and a pair of balancing cylinders disposed in said housing in symmetrical relation with respect to the aforesaid cylinders.

7. In a servo-motor, a working piston; a movable valve element; a control piston; link means operably connecting said element with said control piston; link means operably connecting said element with said working piston; a balancing piston, and lever means operatively connecting said balancing piston and said control piston whereby movement of said control piston is accompanied by opposite movement of said balancing piston.

8. The combination with a servo-motor having an actuating piston, a piston rod, and a valve for controlling the movement of said piston; of a pair of control pistons, means operatively connecting said control pistons to said valve such that said valve is controlled by movement of said control pistons, follow-up linkage operatively connecting said piston rod and said valve, a pair of balancing pistons, and means operatively connecting said balancing pistons with said control pistons whereby movement of one of said control pistons is accompanied by opposite movement of the associated balancing piston.

9. In combination with a supercharger for supplying air through a line to an engine, apparatus for maintaining predetermined supercharger pressure while maintaining the supercharger within its pumping limit throughout relatively wide limits of operating speeds and supercharger inlet air densities respectively, including a waste gate communicating with the said line for permitting the escape of air therefrom; a motor for controlling said gate; a valve for controlling said motor; and control means for said valve subjected to the supercharger pressure at one side and at the other side to a pressure variable in accordance with changes in supercharger inlet air density and engine speed.

10. In combination with an engine supercharger having a waste gate for controlling output of and maintaining the supercharger within its pumping limit, a motor for controlling the waste gate; a valve for controlling said motor; means for operating said valve comprising a pair of control devices respectively subjected to supercharger pressure on one side thereof; means for applying constant predetermined pressure to the opposite side of one of said control devices; and means for applying variable pressure to the opposite side of the other of said control devices, said variable pressure being variable in accordance with changes in supercharger inlet air density and engine speed respectively.

11. In a supercharger control, a waste gate; a piston motor for controlling said gate; a valve for controlling said motor including a valve member adapted for to-and-fro movement from closed position to admit pressure fluid to said motor on opposite sides of the piston thereof; a link pivoted at its center to said valve member; a pair of control devices connected to the opposite ends of said link; means for subjecting one side of said control devices to supercharger discharge pressure; means for subjecting the opposite side of one of said control devices to predetermined desired pressure; and means for subjecting the opposite side of the other control device to variable pressure.

12. In a supercharger control, a waste gate; a piston motor for controlling said gate; a valve for controlling said motor including a valve member adapted for to-and-fro movement from closed position to admit pressure fluid to said motor on opposite sides of the piston thereof; a link pivoted at its center to said valve member; a pair of control devices connected to the opposite ends of said link; means for subjecting one side of said control devices to supercharger discharge pressure; means for subjecting the opposite side of one of said control devices to predetermined desired pressure; and means for subjecting the opposite side of the other control device to variable pressure which pressure varies in accordance with supercharger inlet air density and engine speed.

ALLEN C. STALEY.
DAVID M. BORDEN.
WINTHROP S. HORTON.

(References on following page)

REFERENCES CITED

The following references are of record in the file of this patent:

UNITED STATES PATENTS

| Number | Name | Date |
|---|---|---|
| 737,201 | Brady | Aug. 25, 1903 |
| 1,199,036 | Hodgkinson | Sept. 19, 1916 |
| 1,339,939 | Alter | May 11, 1920 |
| 1,346,124 | Guerrlich | July 13, 1920 |
| 1,818,767 | Swartwout | Aug. 11, 1931 |
| 2,023,403 | Bulter | Dec. 10, 1935 |
| 2,082,397 | Hiscock | June 1, 1937 |
| 2,250,455 | Alkan | July 22, 1941 |
| 2,261,365 | Grove | Nov. 4, 1941 |
| 2,283,541 | Dodson | May 19, 1942 |
| 2,284,687 | Schimanek | June 2, 1942 |
| 2,285,344 | Marples et al. | June 2, 1942 |
| 2,291,653 | Samiran | Aug. 4, 1942 |
| 2,297,213 | Gosslau | Sept. 29, 1942 |
| 2,305,080 | Butler | Dec. 15, 1942 |

FOREIGN PATENTS

| Number | Country | Date |
|---|---|---|
| 106,635 | Great Britain | June 7, 1917 |
| 458,350 | Great Britain | 1936 |

Certificate of Correction

Patent No. 2,442,669. June 1, 1948.

ALLEN C. STALEY ET AL.

It is hereby certified that errors appear in the printed specification of the above numbered patent required correction as follows:

Column 4, line 68, strike out "servo"; column 7, line 5, claim 2, for the word "supercharger" read *engine*;

and that the said Letters Patent should be read with these corrections therein that the same may conform to the record of the case in the Patent Office.

Signed and sealed this 5th day of April, A. D. 1949.

[SEAL]

THOMAS F. MURPHY,
*Assistant Commissioner of Patents.*